United States Patent [19]

Azar et al.

[11] Patent Number: 5,325,179
[45] Date of Patent: Jun. 28, 1994

[54] CIRCUITRY AND METHOD FOR CONVERTING 50 HZ, 312.5 LINE VIDEO COMPOSITE SIGNALS INTO AND FROM 60 HZ, 262.5 LINE VIDEO COMPOSITE SIGNALS

[75] Inventors: Charles T. Azar, Miami, Fla.; Thomas J. Grzabka, Auburn, Calif.

[73] Assignee: Instant Replay, Inc., Miami, Fla.

[21] Appl. No.: 739,199

[22] Filed: Aug. 1, 1991

[51] Int. Cl.$^5$ .............................................. H04N 7/01
[52] U.S. Cl. ..................................... 348/443; 348/454
[58] Field of Search ............ 358/11, 140; H04N 7/01, H04N 11/20

[56] References Cited

U.S. PATENT DOCUMENTS

| 4,751,573 | 6/1988 | Kubota | 358/140 |
| 4,953,025 | 8/1990 | Saitoh et al. | 358/140 |
| 5,021,871 | 6/1991 | Kzar et al. | 358/11 |

FOREIGN PATENT DOCUMENTS

| 4015020 | 11/1991 | Fed. Rep. of Germany | H04N 7/01 |
| 0073489 | 4/1986 | Japan | H04N 7/01 |
| 0194781 | 8/1989 | Japan | H04N 7/01 |
| 0270488 | 11/1990 | Japan | H04N 7/01 |

OTHER PUBLICATIONS

PAL 22V10–10/15 Advanced Micro Devices Brochure, Feb. 1990.
EL2030/EL2030C Nantec Brochure, Aug. 1989 NJM 2240 New Japan Radio Co. Brochure.
TMS4C 1050 Texas Instruments Brochure, Nov. 1990.
TDA8702 Philips Components Brochure, Mar. 1990.
BT208 Brooktree Brochure.

*Primary Examiner*—James J. Groody
*Assistant Examiner*—Jeffrey S. Murrell
*Attorney, Agent, or Firm*—Robert C. Kain, Jr.

[57] ABSTRACT

The system for converting a 50 Hz, 312.5 lines per field video composite input signal into a 60 Hz, 262.5 lines per field video composite output signal includes an A/D converter for converting the entire video input signal into a digital video composite signal. The digital video composite signal is stored in a dual port, FIFO, random access field memory. Write cycle commands are generated by gate array logic (GAL) circuits based upon a color subcarrier signal typical of the 60 Hz, 262.5 line output signal, and a horizontal and vertical field signal based upon the 50 Hz input signal. Read commands for the RAM are generated by the GAL based upon an independently generated 60 cycle (Hz) signal. The GAL also deletes between 15 or 30 video lines from the top of each field based upon a timing relationship from a vertical blanking signal, or in the case of the VCR, the head switch signal and a line count generated from the horizontal sync signal of the video composite input signal. The GAL clocks out the information based upon the selected color subcarrier signal into a D/A converter which in turn transforms the digital video composite signal into an analog video composite signal. The read timing circuit resets the read cycle command when a 262.5, NTSC field line count is exceeded. A single field is converted into a digital format, stored and then reconverted into an analog signal. Conversion from a 60 Hz, 262.5 lines per field signal into a 50 Hz, 312.5 lines per field video composite signal is also disclosed.

15 Claims, 3 Drawing Sheets

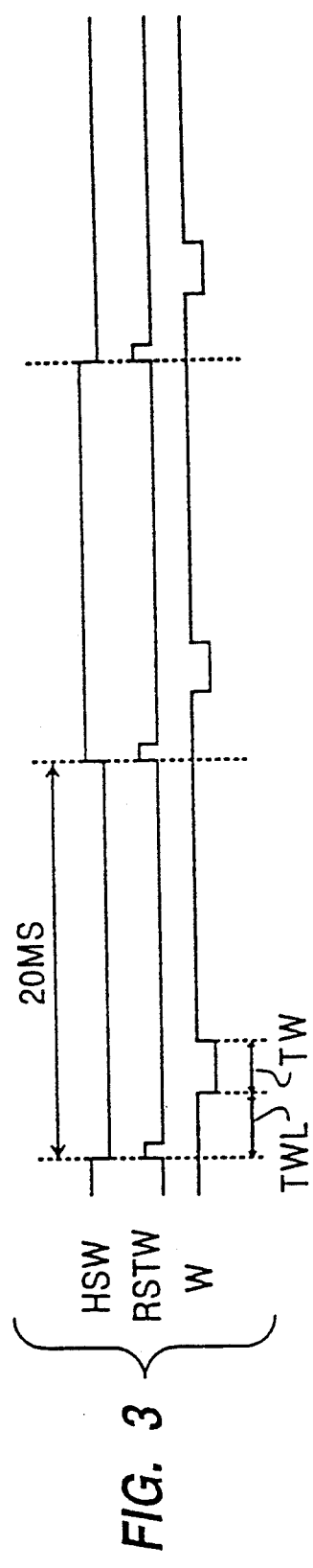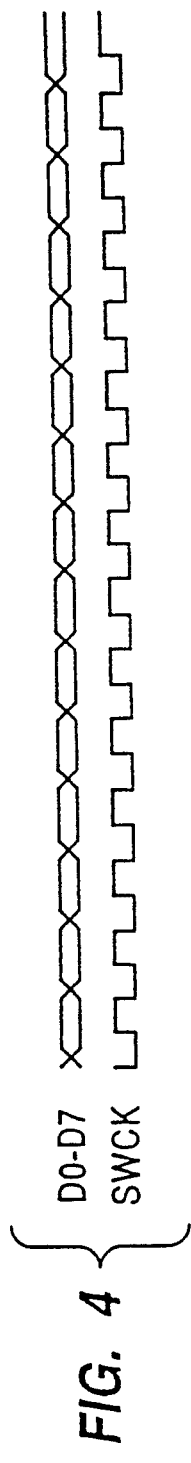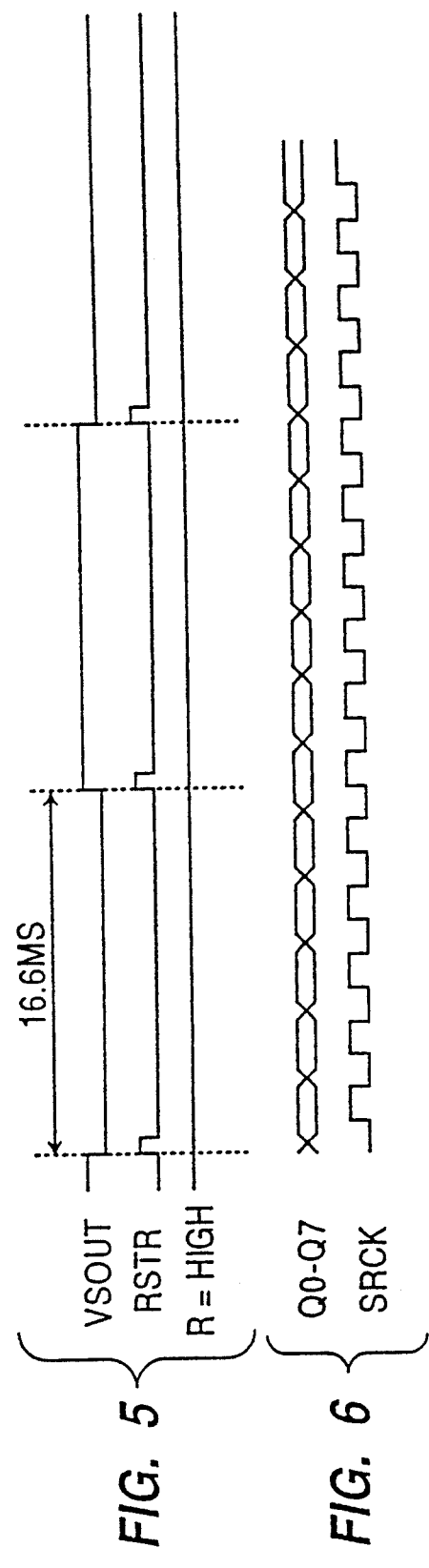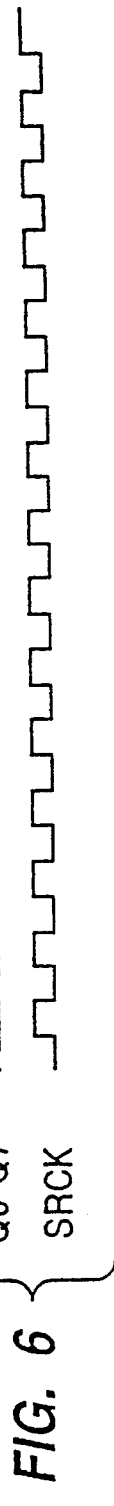
FIG. 3
FIG. 4
FIG. 5
FIG. 6

5,325,179

CIRCUITRY AND METHOD FOR CONVERTING 50 HZ, 312.5 LINE VIDEO COMPOSITE SIGNALS INTO AND FROM 60 HZ, 262.5 LINE VIDEO COMPOSITE SIGNALS

BACKGROUND OF THE INVENTION

The present invention relates to circuitry and a method for converting a 50 Hz, 625 line (312.5 lines per field) PAL-type signal into and from 60 Hz, 525 line (262.5 lines per field) NTSC signals.

In the United States, television signals are formatted in accordance with an NTSC standard. In some foreign countries, television signals are formatted in according to a PAL standard, phase alternating line standard. Sometimes consumers want to play a PAL formatted tape through a video cassette recorder (VCR) and play that tape on an NTSC-type television set.

U.S. patent application Ser. No. 243,259, by C. Azar, et al., filed Sep. 12 1988, now U.S. Pat. No. 5,021,871, discloses a method and system for converting PAL television signals into a quasi-NTSC format. However, the system disclosed in the Azar patent does not handle frame conversion from the 50 hertz (Hz), 625 line PAL signal to the 60 Hz, 525 line NTSC format. Also, the Azar patent does not deal with the fact that the PAL signals have 625 lines per frame (312.5 lines per field) and the NTSC signal has 525 lines per frame (262.5 lines per field).

Prior art devices typically separate or demodulate the PAL-type video composite signal into chrominance and luminance signals. The chrominance signal is then applied to an analog to digital (A/D) converter which is independent of the A/D converter for the luminance signal channel. Additionally, the horizontal and vertical sync pulses for each field are separated from the color and the luminance information signals and discarded. At the output side, there is an independent sync generator to generate horizontal and vertical sync pulses, equalizing pulses, etc. The digital signals are read out of the memory using interpolation circuits, converted to analog and locked to the newly generated sync signals. These prior art devices store at least one frame (two fields) and, many times, several frames in order to permit the interpolation circuits to determine the differences between frame 1 and frame 2, and set the read out control commands properly. The prior art devices do not use FIFO RAMS. Thereafter, the separate signal channels are applied to multiple, independent D/A converters and then the analog signals are remixed together. These conversion systems are costly due to the number of components used.

OBJECTS OF THE INVENTION

It is an object of the present invention to convert a 50 Hz, 312.5 lines per video composite input signal into a 60 Hz, 262.5 lines per field video composite output signal without separating the chrominance, luminance, and vertical and horizontal sync pulses from the video composite input signals. Conversion in the opposite direction is also possible.

It is another object of the present invention to convert a 50 Hz video input signal into a 60 Hz video output signal using fewer components and steps to convert the signal as compared with prior art devices.

It is a further object of the present invention to convert these video composite signals and obtain better resolution of the television picture using the newly generated 60 Hz, 262.5 line video output composite signal.

It is an additional object of the present invention to generate 60 Hz, 262.5 lines per field video composite output signals that eliminate or minimize horizontal motion artifact or the so-called "juttery" image commonly associated with other conversion systems.

SUMMARY OF THE INVENTION

The system for converting a 50 Hz, 312.5 lines per field video composite input signal into a 60 Hz, 262.5 lines per field video composite output signal includes an A/D converter for converting the entire video input signal into a digital video composite signal. The digital video composite signal is stored in a dual port, FIFO, random access field memory. Write cycle commands are generated by gate array logic (GAL) circuits based upon a color subcarrier signal typical of the 60 Hz, 262.5 line output signal, and a horizontal and vertical field signal based upon the 50 Hz input signal. Read commands for the first in, first out (FIFO) RAM are generated by the GAL timing generators based upon an independently generated 60 cycle (Hz) signal. The GAL configured timing generators also delete between 15 or 30 video lines from the top of each field based upon a timing relationship from a vertical blanking signal, or in the case of the VCR, the head switch signal (a signal timed to a vertical PAL field signal) and a line count generated from the horizontal sync signal of the 50 Hz, 312.5 line video composite input signal. The GAL configured timing generator clocks out the information from the FIFO RAM at a multiple of the color subcarrier for the output signal into a D/A converter which in turn transforms the digital video composite signal into an analog video composite signal. The read timing circuit resets the read cycle command when a 262.5, NTSC field line count is exceeded. The entire video composite signal is converted into a digital format, stored and then reconverted into an analog signal. Conversion from a 60 Hz, 262.5 lines per field signal into a 50 Hz, 312.5 lines per field video composite signal is also disclosed.

BRIEF DESCRIPTION OF THE DRAWINGS

Further objects and advantages of the present invention can be found in the detailed description of the preferred embodiment when taken in conjunction with the accompanying drawings in which:

FIG. 3 is a timing diagram for the write sequence;

FIG. 4 is a timing diagram for writing the digitally formatted video composite signal into the FIFO RAM;

FIG. 5 is a timing diagram for the read sequence; and

FIG. 6 is a timing diagram for reading the digital signals from the FIFO RAM to the D/A converter.

DETAILED DESCRIPTION OF THE PREFERRED EMBODIMENT

The present invention relates to circuitry and a method for converting 50 Hz, 312.5 lines per field video composite input signal into a 60 Hz, 262.5 lines per field video composite output signal.

Figure 1:
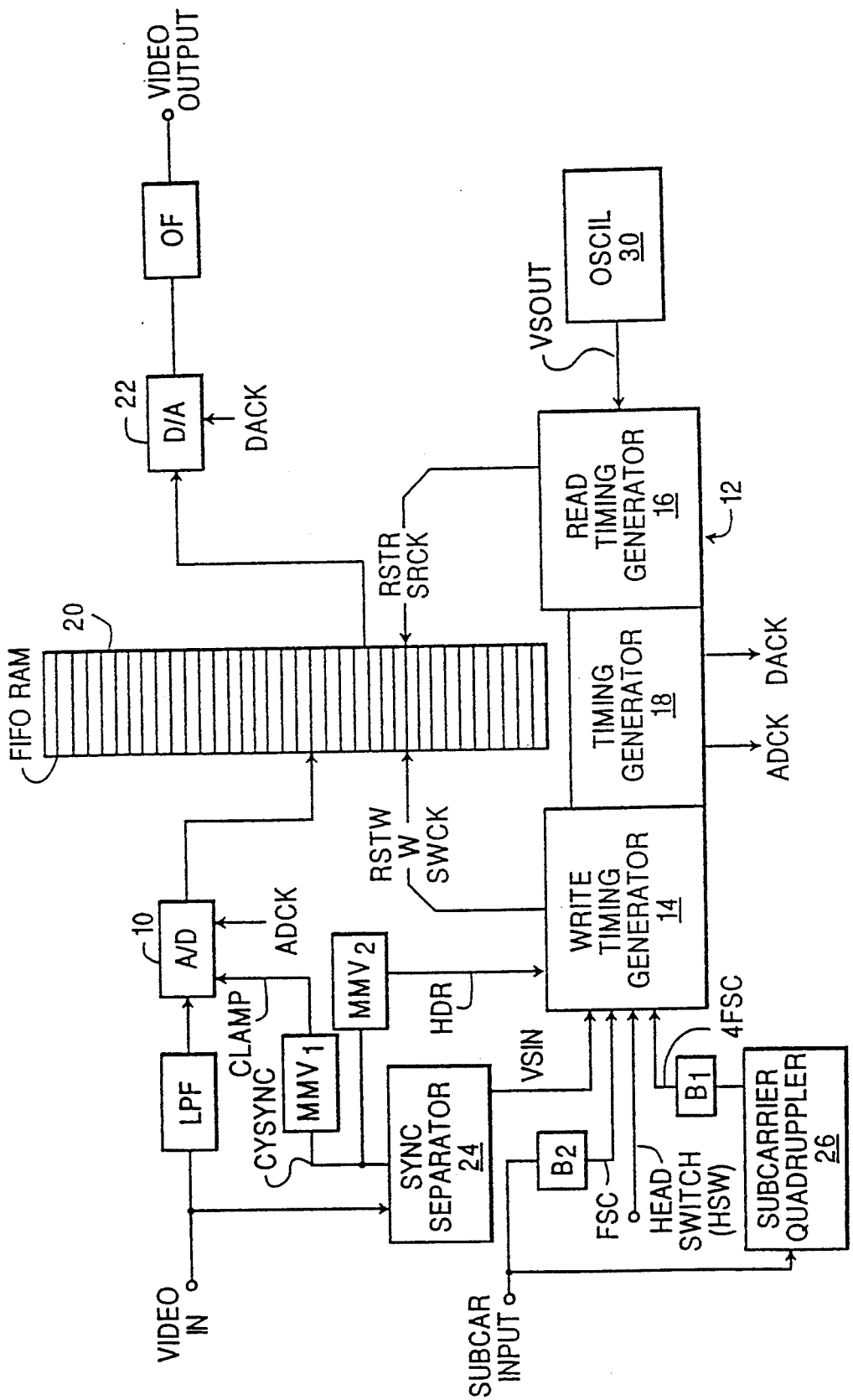
FIG. 1 illustrates a block diagram of the circuitry for converting the 50 Hz, 312.5 lines per field video composite input signals into the 60 HZ, 262.5 lines per field video composite output signals.

The 50 Hz, 312.5 lines per field video composite input signals are applied to the video input as shown in FIG. 1. These video composite signals have already been converted into pseudo NTSC signals as described in U.S. patent application Ser. No. 243,259, filed Sep. 12 1988 by Azar et al. now U.S. Pat. No. 5,021,871, which is incorporated herein by reference thereto. Essentially, those pseudo NTSC signals are simply PAL-type signals wherein every other line of the PAL-type signal has been repeated. The 50 Hz, 312.5 lines per field signals are sometimes referred to herein as PAL-type video signals. Accordingly, if the customary PAL video signal has a line sequence of 1, 2, 3, 4, 5, the pseudo NTSC signal generated by the Azar patent has a line sequence of 1, 1, 3, 3, 5, 5 wherein the chrominance information lines 1, 3, and 5 are repeated and lines 2 and 4 are deleted. Also, the color subcarrier for the PAL-type signal has been changed to 3.58 MHz.

In a VCR, the detected PAL color subcarrier signal is a beat down or reduced signal at approximately 625 KHz. In convention PAL VCRs, the 625 KHz signal is mixed with a complementary signal to obtain the standard PAL 4.43 MHz color subcarrier signal. In the present invention, the detected beat down 625 KHz color subcarrier signal is mixed with a complementary signal to obtain a 3.58 MHz color subcarrier signal. NTSC signals have color subcarriers set at 3.58 MHz. If the present invention was configured as a stand alone circuit, that is, not associated with a VCR, the 4.43 MHz PAL color subcarrier signal would be mixed with a complementary signal to obtain the 3.58 MHz NTSC color subcarrier signal.

In other respects, the PAL-type video composite signal, called a pseudo NTSC signal in the Azar patent, has attributes similar to any PAL signal. That is, it has a vertical rate of 50 Hz, horizontal and vertical blanking and sync pulses comparable to other PAL video signals and 312.5 lines per field. The PAL-type video composite signal is applied to a low pass filter (LPF) which is an anti-aliasing filter that limits bandwidths of the signal to 5 MHz to clean up noise on the signal line. The output of the LPF is fed to the A/D converter 10. The A/D converter 10 is clocked by a timing signal ADCK generated by a timing generator generally identified as timing generator 12 in FIG. 1.

Timing generator 12 has three functional portions, write timing generator 14, read timing generator 16, and converter timing generator 18. In the preferred embodiment, timing generator 12 is configured with gate array logic (GAL) circuits that are programmable. However, the timing generator could be configured as PALs, EPROMS, or as discrete elements such as clocks, counters, and discrete logic circuits to achieve the same results as discussed in detail hereinafter. Write timing generator 14 generates write cycle commands for FIFO RAM 20. FIFO RAM 20 generally stores an entire field of digital video composite signals. The write cycle commands are reset write RSTW, write W, and write clock SWCK. Digital signals from A/D converter 10 are clocked into and written into FIFO RAM 20 based upon the reset write signal RSTW which sets a pointer to the top of the memory stack in FIFO RAM 20, the write command W which is normally high but is pulled low for a certain period of time to ignore a predetermined number of lines in the field, and the write clock SWCK which actually clocks each digital byte into the FIFO field memory.

Digital video composite signals are read from FIFO RAM 20 based upon the reset read command RSTR and the read clock command SRCK. The read command R for FIFO RAM 20 is set high at all times. The Field Memory Table which follows sets forth a particular working embodiment for FIFO RAM 20 utilizing two memory integrated circuits.

FIELD MEMORY TABLE

| Pin No. | Signal | From/To |
|---|---|---|
| | Memory 1 | |
| 8 | D0 | A/D (D0) |
| 13 | D1 | A/D (D1) |
| 14 | D2 | A/D (D2) |
| 15 | D3 | A/D (D3) |
| 5 | W | GAL1 (W1) |
| 6 | RSTW | GAL1 (RSTWD) |
| 7 | SWCK | GAL1 |
| 20 | Q0 | D/A (D0) |
| 19 | Q1 | D/A (D1) |
| 18 | Q2 | D/A (D2) |
| 17 | Q3 | D/A (D3) |
| 3 | R | SET HIGH |
| 2 | RSTR | GAL1 (RSTRD) |
| 1 | SRCK | GAL1 |
| | Memory 2 | |
| 8 | D0 | A/D (D4) |
| 13 | D1 | A/D (D5) |
| 14 | D2 | A/D (D6) |
| 15 | D3 | A/D (D7) |
| 5 | W | GAL1 (W1) |
| 6 | RSTW | GAL1 (RSTWD) |
| 7 | SWCK | GAL1 |
| 20 | Q0 | D/A (D4) |
| 19 | Q1 | D/A (D5) |
| 18 | Q2 | D/A (D6) |
| 17 | Q3 | D/A (D7) |
| 3 | R | SET HIGH |
| 2 | RSTR | GAL1 (RSTRD) |
| 1 | SRCK | GAL1 |

There is approximately 1 Mb of memory in FIFO RAM 20. Two memory chips are utilized because each chip handles four bits. In the Field Memory Table, the From/To column identifies which component the particular pin is connected to as well as the signal designation for that coupled component. For example, in Memory 1, pin 6 receives the reset write signal RSTW. This reset write signal corresponds to signal RSTWD generated by the timing generator component GAL1. As is customary in the industry, input signals to FIFO RAM 20 are designated as D# and output signals are designated as Q#. Accordingly, with respect to memory chip 1 and pin 19, output bit Q1 for FIFO RAM 20 is the equivalent of input signal D1 applied to D/A converter 22.

The digital video signals are clocked out of FIFO RAM 20 based upon reset read commands RSTR and read clock SRCK. These signals are applied to D/A converter 22. D/A converter 22 converts the digital video composite signal into an analog signal based upon a clock DACK. The output of D/A converter 22 is fed to an output filter OF and ultimately to a video output. The output filter removes quantinization noise introduced into the digital signal by the 4×multiplied color subcarrier signal (4FSC) fed to timing generator 12.

Unlike prior art devices, the present invention uses a dual port, FIFO RAM which stores only a single field of information including all sync signals. Other systems process the digitally stored data; the present invention simply writes in the data and then reads out the data without processing it or analyzing it in any fashion.

Timing generator 12 receives various signals to generate the appropriate clocking signals and read and write cycle commands. One of these signals is a vertical sync signal VSIN obtained from sync separator 24. The input of sync separator 24 is coupled to the video input and receives the PAL-type video composite signal. Sync separator 24 takes the composite video signal and separates out vertical sync and horizontal sync pulses to obtain a composite sync signal. This composite sync signal is a combination of the horizontal and vertical pulses and is identified in FIG. 1 as CSYNC. The composite sync signal is applied to a one-shot or monostable multivibrator $MMV_1$. $MMV_1$ is triggered to generate an output as a clamp signal at the negative edge of the horizontal sync pulse from CSYNC. This clamp signal is fed to A/D converter 10. The clamp signal is used to restore the DC level to the video composite signal input into converter 10. The black level, for example, should have a certain DC level. The video composite signal input into A/D converter 10 sometimes varies and it is important to establish a set level or clamp the output of A/D converter 10 to a set voltage at a certain point in time in the field cycle. The clamp signal, derived from the horizontal sync pulses, clamps the output of A/D converter 10 to a predetermined voltage at that certain point in the composite video signal cycle.

The composite sync signal CSYNC is also fed to one-shot or monostable multivibrator $MMV_2$ which generates a horizontal drive signal HDR for timing generator 12. $MMV_2$ generates a single pulse of a certain length in the presence of the horizontal sync pulse in the composite sync signal CSYNC which in turn is directly related to the horizontal sync pulse in the PAL-type video composite signal at the video input.

Timing generator 12 also receives a 3.58 MHz color subcarrier signal from the chroma oscillator in the VCR. This 3.58 MHz color subcarrier signal is initially buffered by amplifiers and inversion circuits by buffer $B_2$. The buffered signal is FSC and is applied to timing generator 12. The 3.58 MHz color subcarrier signal is also applied to subcarrier quadrupler 26 which simply multiplies the color subcarrier 3.58 MHz signal by four. The output of subcarrier quadrupler 26 (4FSC) is fed to another buffer circuit $B_1$ which includes amplifiers and inverters to condition the signal for timing generator 12. The output of buffer $B_I$ is called herein 4FSC. The 3.58 MHz signal is the color subcarrier signal for the preferred output video composite signal.

Timing generator 12 also receives a head switch signal HSW from the circuitry in the VCR which controls the selection of outputs from VCR playback head 1 and head 2. In VCR technology, two playback or read heads are used and the HSW signals select one or the other output approximately six or seven lines before the vertical sync pulse in each field. It has been found that the head switch signal introduces artifacts into the video composite signal detected in a VCR and adversely affects the digital to analog conversion of that composite video signal. Due to the switching of the heads, there is an interruption in the detected PAL signal. This is a timing interruption that affects the time of the horizontal sync pulses and the count. If the present conversion was installed in conjunction with any other form of PAL input signal other than a VCR (such as a satellite receiver or an off the air signal), it would not be necessary to utilize the head switch signal. Other vertical sync signals could be used. In the present embodiment, the head switch signal is used to reset FIFO RAM 20 during the write cycle and is used to write the entire vertical interval to FIFO.

In order to convert the 50 cycle, 312.5 lines per field, PAL-type video composite signal into a 60 cycle, 262.5 lines per field, NTSC-type video composite signal, oscillator 30 is utilized. Oscillator 30 generates a 60 cycle signal VSOUT which is applied to timing generator 12.

The following Component Table lists the components, models numbers and manufacturers of the significant items shown in FIG. 1.

| COMPONENT TABLE | | |
|---|---|---|
| A/D Converter | BT208KP | Brooktree Corp. San Diego, CA |
| D/A Converter | BT106KC30 | Brooktree Corp. San Diego, CA |
| Field Memories (2X) | TMS4C1050SD 1 Mb | Texas Instruments Houston, TX |
| Subcarrier Qua druppler | NJM2240 | New Japan Radio Co. from Silicon Valley Sales San Jose, CA |
| GALs 1 and 2 | GAL 22V10-15LP PAL 22V10-10/15 | Advanced Micro Devices |

Figure 2:
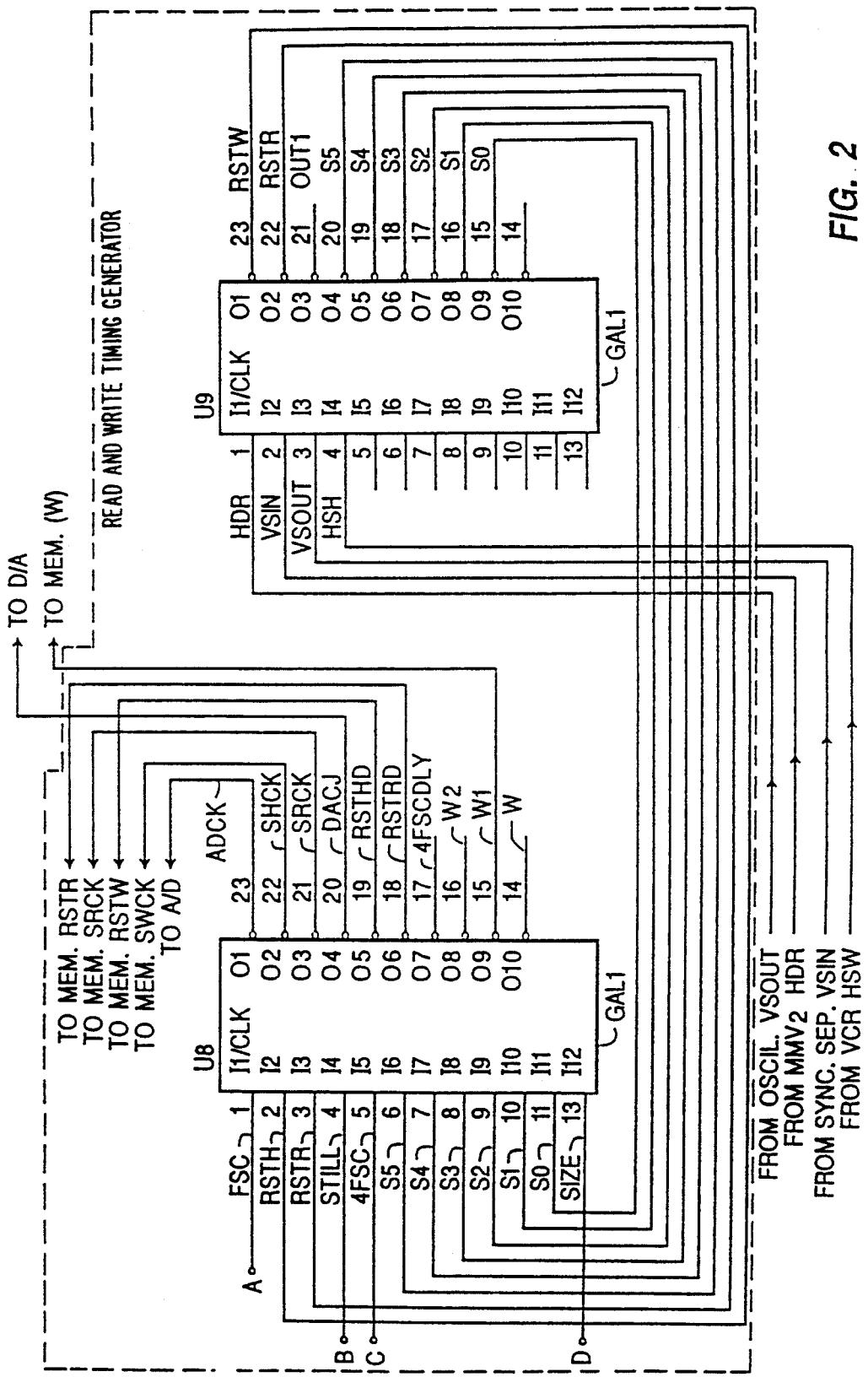
FIG. 2 is a detail of the read and write timing generator.

In a preferred embodiment, timing generator 12 is configured with two gate array logic (GAL) integrated circuits, illustrated in FIG. 2. The following Gate Array Logic Table lists the pin numbers, the input/out numbers, the GAL signal identification code, and the coupled component and component signal for GAL1 and GAL2.

| GATE ARRAY LOGIC TABLE | | | |
|---|---|---|---|
| GAL1 (15 nanosecond) | | | |
| Pin | I/O # | GAL Signal | Component (Signal) |
| 1 | I1/CLK | FSC | subcarrier input (A) |
| 2 | I2 | RSTW | |
| 3 | I3 | RSTR | |
| 4 | I4 | STILL | VCR still command (B) |
| 5 | I5 | 4FSC | 4FSC Subcar. 4X(C) |
| 6 | I6 | S5 | |
| 7 | I7 | S4 | |
| 8 | I8 | S2 | |
| 9 | I9 | S2 | |
| 10 | I10 | S1 | |
| 11 | I11 | S0 | |
| 13 | I12 | SIZE | Gnd. Jumper (D) |
| 23 | O1 | ADCK | |
| 22 | O2 | SWCK | |
| 21 | O3 | SRCK | |
| 20 | O4 | DACK | |
| 19 | O5 | RSTWD | FIFO (RSTW) |
| 18 | O6 | RSTRD | FIFO (RSTR) |
| 17 | O7 | 4FSCDLY | |
| 16 | O8 | W2 | |
| 15 | O9 | W1 | |
| 14 | O10 | W | |
| GAL2 (25 nanosecond) | | | |
| Pin | I/O # | GAL Signal | |
| 1 | I1/CLK | HDR | |
| 2 | I2 | VSIN | |
| 3 | I3 | VSOUT | |
| 4 | I4 | HSW | |
| 23 | O1 | RSTW | |
| 22 | O2 | RSTR | |
| 21 | O3 | OUT1 | |
| 20 | O4 | S5 | |
| 19 | O5 | S4 | |
| 18 | O6 | S3 | |
| 17 | O7 | S2 | |

-continued

GATE ARRAY LOGIC TABLE

| 16 | O8 | S1 |
|----|----|----|
| 15 | O9 | S0 |

Most of the signals set forth in Gate Array Logic Table have been discussed above. The STILL signal is generated by the VCR and is optional. Essentially, when the VCR operator selects a still or pause, the VCR generates a STILL signal and that signal is applied to input 4 of GAL 1. Accordingly, GAL 1 would generate read cycle commands for the duration of the STILL command and would inhibit the write cycle commands. The GAL signals identified by S# or W# are internal connections and internal signal identifiers which correspond to the program set forth at the end of the specification before the claims. The SIZE signal is connected to a jumper which leads to ground that changes the number of lines ignored during the write cycle of FIFO RAM 20. If a small size is needed, the jumper is set to a certain place and 15 video lines are ignored or not Written into FIFO RAM 20. When the jumper is in the other position (position 1 grounded or position 2 non-grounded), 33 video lines are not written into the FIFO RAM. The reset write cycle command RSTW for FIFO RAM 20 is characterized as RSTWD because the signal is slightly delayed due to component processing delays. Essentially, the delays for RSTWD, RSTRD and 4FSCDLY are delayed internally to assure proper setup and hold times for the A/D converter, the D/A converter and FIFO MEMORY 20.

It should be noted that GAL2 generates an output O1 RSTW which is applied to GAL1 at input I2. GAL2 at output O5 generates RSTWD for the FIFO RAM which in turn is identified as FIFO RSTW.

FIG. 3 illustrates a timing diagram for the write sequence for FIFO RAM 20. When head switch signal HSW goes low, the timing generator 12, and particularly GAL1 (RSTWD signal), generates a reset write command RSTW of a certain duration to reset FIFO RAM 20. This reset sets the pointer location in FIFO RAM 20 to the first memory location in the memory. Also, the timing generator begins counting video lines by monitoring the horizontal drive signal HDR. When a certain number of lines have been counted, in the preferred embodiment 23 lines which equals a timing delay TWL, the write command W goes low. When write command W goes low, FIFO RAM 20 stops writing digital signals appearing on the signal bus spanning A/D converter 10 and FIFO RAM 20. The timing generator continues to count horizontal sync pulses by monitoring the horizontal drive signal HDR which corresponds to time period TW. Dependent upon the placement of the jumper (SIZE I12), time TW corresponds 15 video lines or 33 video lines. After the appropriate count, write command W goes high and FIFO RAM 20 continues to store a digital representation of the analog video signal in a stacked formation in the memory.

FIG. 4 illustrates the clocking sequence for data lines D0 through D7 and the write clock command SWCK for FIFO RAM 20. A/D converter samples the composite video signal at its input in accordance with a clock signal ADCK. As shown in the computer program which follows, the A/D clock, the D/A clock, and the read clock and write clock for FIFO RAM 20 are equivalent to 4FSCDLY which is the 4× color subcarrier signal delayed an appropriate amount of time for digital handling. Accordingly, ADCK, SWCK, SRCK and DACK are all equal to 4FSCDLY but are independently output by GAL1 to insure that those critical command signals properly drive the associated components.

FIG. 5 illustrates a timing diagram for the read cycle for FIFO RAM 20. VSOUT is a signal generated by independent oscillator 30 and applied to GAL2. VSOUT is a 60 cycle signal (16.6 ms cycle) as compared with the 50 cycle head switch signal HSW (20 ms). When VSOUT goes low, the reset read command RSTR is generated by GAL1 as RSTRD. In the presence of the reset read cycle command, FIFO RAM 20 begins reading from the top of the memory stack. The reset read command effectively ignores the extra video lines in each PAL field stored in the FIFO RAM. As shown in FIG. 5, the read command R is maintained high for FIFO RAM 20.

FIG. 6 shows the clocking signal for the output of FIFO RAM 20 QO through Q7. As stated earlier, SWCK is the equivalent of SRCK which is also the equivalent of 4XFSC which are all set equal to 14.316 MHz.

In summary, the write cycle for FIFO RAM 20 is generally triggered by a 50 cycle signal ultimately related to the 50 cycle, 312.5 line, PAL-type video composite signal. The head switch signal, in the preferred embodiment, corresponds to the vertical sync cycle of the PAL-type signal and is simply one way of clocking in the digital words into FIFO RAM 20. On the other hand, digital information is read from FIFO RAM 20 based upon an independently generated 60 cycle (Hz) signal which corresponds to the 60 Hz, 262.5 line output signal and is VSOUT independently generated by oscillator 30. Accordingly, write in cycle commands are substantially independent of the read out cycle commands. The dual port FIFO RAM 20 converts not only the color information in the video composite signal, but also the horizontal and vertical sync pulses. This is very different from most prior art devices. FIFO RAM 20 stores substantially a full field of the digitally converted PAL-type video composite signals. Of course, between 15 and 30 video lines of this field are not written into FIFO RAM 20 in order to convert the 312.5 lines per field PAL-type signal into an approximately 262.5 lines per field NTSC-type signal. The extra lines not deleted (the 15 or 33 video lines) do not affect the display of the NTSC-type signal output. The remaining video lines from the 312.5 PAL field to the 262.5 NTSC field are ignored since the reset read command occurs at 60 Hz intervals and reading begins at the top of the FIFO stack. Essentially, a respectable number of video lines are ignored at the bottom of each PAL field.

The particular program for GAL1 and GAL2 follows, as does the simulation.

| Computer Program |
|---|
| CHIP conv1 PAL 22V10 GAL1 |
| ; COPYRIGHT INSTANT REPLAY INC 1991 |
| ;------------------PIN Declarations---------- |

-continued

Computer Program

| PIN 1 | CLOCK (FSC) | COMBINATORIAL | ; INPUT |
|---|---|---|---|
| PIN 2 | RSTW | COMBINATORIAL | ; INPUT |
| PIN 3 | RSTR | COMBINATORIAL | ; INPUT |
| PIN 4 | STILL | COMBINATORIAL | ; INPUT |
| PIN 5 | 4FSC | COMBINATORIAL | ; INPUT |
| PIN 6 | s5 | COMBINATORIAL | ; INPUT |
| PIN 7 | s4 | COMBINATORIAL | ; INPUT |
| PIN 8 | s3 | COMBINATORIAL | ; INPUT |
| PIN 9 | s2 | COMBINATORIAL | ; INPUT |
| PIN 10 | s1 | COMBINATORIAL | ; INPUT |
| PIN 11 | s0 | COMBINATORIAL | ; INPUT |
| PIN 12 | GND | | |
| PIN 13 | SIZE | COMBINATORIAL | ; INPUT |
| PIN 14 | W | REGISTERED | ; OUTPUT |
| PIN 15 | W1 | COMBINATORIAL | ; OUTPUT |
| PIN 16 | W2 | COMBINATORIAL | ; OUTPUT |
| PIN 17 | 4FSCDLY | COMBINATORIAL | ; OUTPUT |
| PIN 18 | RSTRD | REGISTERED | ; OUTPUT |
| PIN 19 | RSTWD | REGISTERED | ; OUTPUT |
| PIN 20 | DACK | COMBINATORIAL | ; OUTPUT |
| PIN 21 | SRCK | COMBINATORIAL | ; OUTPUT |
| PIN 22 | SWCK | COMBINATORIAL | ; OUTPUT |
| PIN 23 | ADCK | COMBINATORIAL | ; OUTPUT |
| PIN 24 | VCC | | |

EQUATIONS
ADCK = 4FSCDLY
SRCK = 4FSCDLY
SWCK = 4FSCDLY
DACK = 4FSCDLY
RSTWD := RSTW*STILL
RSTRD := RSTR
4FSCDLY = 4FSC
W1= s0* s1* s2* /s3*s4*/s5 + /w2      ; STARTS DELETING LINES AT
                                        LINE 23
w2= SIZE*/s0*/s1*/s2*s3*s4*s5    ; ENDS DELETING LINES AT LINE 56
                                   (33 LINES)
+ /SIZE*/s0*s1*s2*/s3*/s4*s5     ; ENDS DELETING LINES AT LINE 38
                                   (15 LINES)
+ /W1
W := W2*STILL

CHIP conv2 PAL22V10 GAL2
;COPYRIGHT INSTANT REPLAY INC 1991
;----------------------PIN Declarations-------------

| PIN 1 | CLOCK (HDR) | COMBINATORIAL | ; INPUT |
|---|---|---|---|
| PIN 2 | VSIN | COMBINATORIAL | ; INPUT |
| PIN 3 | VSOUT | COMBINATORIAL | ; INPUT |
| PIN 4 | HSW | COMBINATORIAL | ; INPUT |
| PIN 12 | GND | | |
| PIN 15 | s0 | REGISTERED | ; OUTPUT |
| PIN 16 | s1 | REGISTERED | ; OUTPUT |
| PIN 17 | s2 | REGISTERED | ; OUTPUT |
| PIN 18 | s3 | REGISTERED | ; OUTPUT |
| PIN 19 | s4 | REGISTERED | ; OUTPUT |
| PIN 20 | s5 | REGISTERED | ; OUTPUT |
| PIN 21 | OUT1 | REGISTERED | ; OUTPUT |
| PIN 22 | RSTR | REGISTERED | ; OUTPUT |
| PIN 23 | RSTW | REGISTERED | ; OUTPUT |
| PIN 24 | VCC | | |

EQUATIONS
RSTS := / VSOUT  ; synchronized output vertical timing
OUT1 := HSW      ; head switch delayed by one hdrive
RSTW := /OUT1*HSW + /HSW*OUT1    ; makes short pulse after positive
                                    and negative
                                 ; edge of head switch
;s0-s5  starts at rstw and holding the state after 64 hdr
;until next rstw
s0  := /s0 * /(/s0*s1*s2*s3*s4*s5)
    + s0 *  (/s0*s1*s2*s3*s4*s5)
    + RSTW
s1  := s0 * /s1 *  /(/s0*s1*s2*s3*s4*s5)
    + /s0 *  s1 *  /(/s0*s1*s2*s3*s4*s5)
    + /s0 *  s1 *   (/s0*s1*s2*s3*s4*s5)
    + RSTW
s2  := s0 * s1 * /2s2 *  /(/s0*s1*s2*s3*s4*s5)
    + /s1 *  s2 *  /(/s0*s1*s2*s3*s4*s5)
    + /s0 *  s2 *  /(/s0*s1*s2*s3*s4*s5)
    +        s2 *   (/s0*s1*s2*s3*s4*s5)
    + RSTW
s3  := s0 * s1 * s2 * /s3 *  /(/s0*s1*s2*s3*s4*s5)
    + /s2 *  s3 *  /(/s0*s1*s2*s3*s4*s5)
    + /s1 *  s3 *  /(/s0*s1*s2*s3*s4*s5)

-continued

| Computer Program |
|---|
| + /s0 * s3 * /(/s0*s1*s2*s3*s4*s5) |
| +       s3 *  (/s0*s1*s2*s3*s4*s5) |
| + RSTW |
| s4 :=0 s0 * s1 * s2 * s3 * /s4 * /(/s0*s1*s2*s3*s4*s5) |
| + /s3 * s4 * /(/s0*s1*s2*s3*s4*s5) |
| + /s2 * s4 * /(/s0*s1*s2*s3*s4*s5) |
| + /s1 * s4 * /(/s0*s1*s2*s3*s4*s5) |
| + /s0 * s4 * /(/s0*s1*s2*s3*s4*s5) |
| +       s4 *  (/s0*s1*s2*s3*s4*s5) |
| + RSTW |
| s5 := s0 * s1 * s2 * s3 * s4 * /s5 * /(/s0*s1*s2*s3*s4*s5) |
| + /s4 * s5 * /(/s0*s1*s2*s3*s4*s5) |
| + /s3 * s5 * /(/s0*s1*s2*s3*s4*s5) |
| + /s2 * s5 * /(/s0*s1*s2*s3*s4*s5) |
| + /s1 * s5 * /(/s0*s1*s2*s3*s4*s5) |
| + /s0 * s5 * /(/s0*s1*s2*s3*s4*s5) |
| +       s5 *  (/s0*s1*s2*s3*s4*s5) |
| + RSTW |
| SIMULATION |
| SETF /HSW /VSIN /VSOUT |
| CLOCKF CLOCK |
| CLOCKF CLOCK |
| CLOCKF CLOCK |
| CLOCKF CLOCK |
| CLOCKF CLOCK |
| SETF HSW |
| FOR I:=1 TO 66 DO |
| BEGIN |
| CLOCKF CLOCK |
| END |
| SETF /HSW |
| FOR I:=1 TO 10 DO |
| CLOCKF CLOCK |
| END# |

The 60 Hz, 525 line (262.5 lines per field) NTSC signal can be converted into a 50 Hz, 625 line video composite signal (312.5 lines per field) using the FIFO, dual port RAM, additional timing circuitry and black video signal data stored in the RAM. Additional lines can be added to the 262.5 line per field input signal by inserting "black" color video data stored in select memory locations in the RAM to obtain the 312.5 lines per field output signal.

The claims appended hereto are meant to cover modifications and changes within the spirit and scope of the present invention.

What is claimed is:

1. A system for converting a 50 Hz, 312.5 lines per field unalternating chrominance composite signal having horizontal and vertical sync pulses included therein into and from a 60 Hz, 262.5 lines per field unalternating chrominance composite signal comprising:
   means for converting the unalternating chrominance composite input signal into a digital composite signal;
   means for storing said digital composite signal; and,
   means for converting said digital composite signal into an analog composite output signal;
   wherein said input signal is one of said 50 Hz, 312.5 lines per field unalternating chrominance composite signal and said 60 Hz, 262.5 lines per field unalternating chrominance composite signal and said output signal is the other of said 50 Hz, 312.5 lines per field unalternating chrominance composite signal and said 60 Hz, 262.5 lines per field unalternating chrominance composite signal.

2. A system for converting as claimed in claim 1 wherein said input composite signal includes analog color information and horizontal and vertical blanking signals, said means for storing stores a digital version of said color information and said horizontal and vertical blanking signals for an entire field; said system including means for clocking data from said means for storing at a rate which is a multiple of a frequency of a color subcarrier signal required by said output signal.

3. A system for converting as claimed in claim 1 including a write timing command generator controlling a write cycle of said means for storing such that a single field of composite signals is stored therein, said write generator timing being based upon one of said 50 Hz signal and said 60 Hz signal corresponding to a frequency of said input composite signal.

4. A system for converting as claimed in claim 1 including a read timing command generator controlling a read cycle of said means for storing such that a single field of composite signals is periodically read from said means for storing, said read generator read cycle timing being based upon the other of said 60 Hz signal and said 50 Hz signal corresponding to said output composite signal.

5. A system for converting as claimed in claim 1 wherein said means for storing is a first-in, first-out storage means, said system including a controller means for generating a write cycle and a read cycle command for said means for storing, said write cycle command being substantially independent of said read cycle command generated by said controller means and applied to said means for storing.

6. A system for converting as claimed in claim 5 wherein said means for storing is a dual port random access memory (RAM), said write cycle command resets a write pointer in said RAM and said read cycle command resets a read pointer in said RAM.

7. A system for converting as claimed in claim 6 wherein said RAM substantially stores one field of said composite input signal as a digital composite signal, said one field including horizontal and vertical sync signal data.

8. A system for converting as claimed in claim 1 wherein said means for storing is a dual port RAM that substantially stores one field of said composite input signal as a digital composite signal, said one field including horizontal and vertical sync signal data.

9. A method for converting an analog input unalternating chrominance composite signal into an analog unalternating chrominance output composite signal, both said composite signals including color information and horizontal and vertical sync signals, wherein said input signal is one of a 50 Hz, 312.5 lines per field composite signal and a 60 Hz, 262.5 lines per field composite signal and said output signal is the other of said 50 Hz, 312.5 lines per field composite signal and said 60 Hz, 262.5 lines per field composite signal, the method comprising the steps of:

converting said analog input composite signal into a digital signal at a rate which is a multiple of a frequency of a color subcarrier signal substantially equivalent to said output composite signal;

storing substantially a full field of the digitally converted input signal; and converting said digital signal into said analog composite signal based upon an independently generated, timing signal having a cyclic rate which is substantially equivalent to a predetermined frequency of said output composite signal.

10. A method as claimed in claim 9 wherein said input signal is said 50 Hz, 312.5 lines per field composite signal and including the step of ignoring a predetermined number of lines in the field of said input signal during the storage step.

11. A method as claimed in claim 10 wherein said composite input signal is obtained from a video cassette recorder which generates a video head switch signal, the method including the step of ignoring said predetermined number of lines of during the storage step based upon a predetermined line count from said video head switch signal.

12. A system for converting one of a first unalternating chrominance composite signal having a first predetermined frequency and line per field format and a second unalternating chrominance composite signal having a second predetermined frequency and line per field format into the other composite signal comprising:

means for converting one of said first composite signal and said second composite signal into a stream into a stream of digital composite signals;

means for storing said digital composite signal stream on a first in, first out basis; and, means for converting the stored digital composite signal stream into the other one of said first composite signal and said second composite signal.

13. A system for converting as claimed in claim 12 including a timing command generator controlling a write cycle and a read cycle for said means for storing respectively based upon a detected periodic signal appearing in one of said first composite signal and said second composite signal and (b) an independently generated timing signal corresponding to a predetermined frequency in the other one of said first composite signal and said second composite signal.

14. A system for converting as claimed in claim 12 including means for clocking data to and from said means for storing at a rate which is a multiple of a frequency of a color subcarrier signal substantially equivalent to said other one of said first composite signal and said second composite signal.

15. A method for converting an analog input unalternating chrominance composite signal into an analog unalternating chrominance output composite signal, both said composite signals including color information and horizontal and vertical sync signals, wherein said input signal is one of a 50 Hz, 312.5 lines per field composite signal and a 60 Hz, 262.5 lines per field composite signal and said output signal is the other of said 50 Hz, 312.5 lines per field composite signal and said 60 Hz, 262.5 lines per field composite signal, the method comprising the steps of:

converting said analog input composite signal into a digital signal at a rate which is a multiple of a frequency of a color subcarrier signal substantially equivalent to said output composite signal;

storing substantially a full field of the digitally converted input signal; and converting said digital signal into said analog composite signal based upon an independently generated, timing signal having a cyclic rate which is substantially equivalent to the frequency of said output composite signal; and said composite input signal being obtained from a video cassette recorder which generates a video head switch signal, the method including the step of ignoring a predetermined number of lines of during the storage step based upon a predetermined line count from said video head switch signal.

* * * * *